United States Patent Office 3,294,806
Patented Dec. 27, 1966

3,294,806
TERTIARYAMINO ALKYL AND TERTIARY-
AMINO ALKYLOXY ALKYL DECALIN-9-
CARBOXYLATES
Charles H. Tilford, Morristown, N.J., assignor to Warner-
Lambert Pharmaceutical Company, Morris Plains, N.J.,
a corporation of Delaware
No Drawing. Filed Apr. 1, 1964, Ser. No. 356,660
6 Claims. (Cl. 260—294.3)

This invention relates to new substituted decalin-9-carboxylates having anti-spasmodic activity. More particularly, the invention relates to a method for the preparation of a new class of substituted decalin-9-carboxylates characterized by unusual anti-spasmodic activity and having the following general formula:

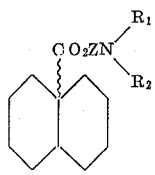

(I)

wherein $R_1$ and $R_2$ are lower alkyl radicals, or taken together with the nitrogen atom, a five- or six-membered heterocyclic radical; and Z is a lower alkylene radical or a lower alkylene oxy-alkylene radical.

Generally, the present invention provides a method for the prepartion of therapeutically useful substituted esters of decalin-9-carboxylic acid which are formed by reacting decalin-9-carboxylic acid with certain substituted amine reactant halides in a lower alkanol reaction medium. More particularly, this invention provides a new class of substituted esters of decalin-9-carboxylic acid which are characterized by unusual anti-spasmodic activity.

It is an object of the present invention to provide a series of easily prepared synthetic compounds which are physiologically active but not subject to objectionable chemical and biological breakdown characterized in previously known anti-spasmodic compounds.

It is also an object of this invention to provide a method for the preparation of a new series of easily prepared substituted decalin-9-carboxylates characterized by unusual anti-spasmodic properties.

It is specifically an object of this invention to provide a new series of substituted decalin-9-carboxylates characterized by unusual anti-spasmodic properties.

Other objects and advantages will become apparent from the following detailed description.

The present invention contemplates substituted esters of decalin-9-carboxylates characterized by anti-spasmodic activity and having the general formula given above in which the "R" groups may be varied as desired. The groups represented by $R_1$ and $R_2$ are preferably the same but may, with refined preparation procedures, be different radicals, all of which are selected from the lower alkyl radicals having from about 1 to about 6 carbon atoms and together with the nitrogen atom a five- or six-membered heterocyclic radical. The groups represented by Z include lower alkylene radicals having from about 2 to about 4 carbon atoms and lower alkylene oxy-alkylene radicals having a total of 4 to 6 carbon atoms with the oxy groups substituted therein as desired.

The new method for the preparation of the therapeutically useful substituted esters of decalin-9-carboxylic acid initially involves dissolving either cis- or trans-decalin-9-carboxylic acid in an alcoholic reaction medium such as, for example, 2-propanol or the like. The cis-decalin-9-carboxylic acid may be represented by the formula:

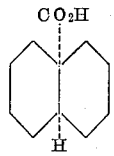

(II)

whereas the trans-decalin-9-carboxylic acid may be represented by the formula:

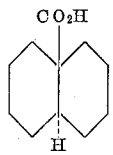

(III)

Decalin-9-carboxylic acids usefully employed as starting materials include cis- and trans-decalin-9-carboxylic acids as generally reported by Pencock et al., J. Am. Chem. Soc. 81: 6332, (1959). These acids and the resulting cis- and trans-reaction products as prepared herein may be easily distinguished from each other by methods well known in the art such as by melting point, infrared spectrographic analysis or the like.

After the cis- or trans-decalin-9-carboxylic acid is dissolved in the reaction medium, a substituted amino reactant halide is added to the solution and the reaction mixture is heated to reflux temperatures such as, for example, about 85° C. to about 95° C. for a reaction period sufficient to form a substantial yield of product. The reaction time will necessarily depend upon the temperature of reaction, the amount of reactants used, and the efficiency of the apparatus. After the reaction is complete, the mixture is evaporated to dryness and treated with an excess of dilute akali. The oily base is extracted with ether and treated with alcoholic hydrochloric acid to give a white crystalline hydrochloride salt. If desired, other non-toxic acid addition salts may be prepared such as the sulfate, the phosphate, the hydrobromide, the succinate, the cyclamate, the acetate and the like by treatment with the corresponding acid. However, when used for therapeutic purposes, only such acid addition compounds are used which are compatible or inert to the human body.

The substituted amino reactant halides used as starting materials to react with the cis and trans-decalin-9-carboxylic acids are defined herein to include the substituted amino lower alkyl halides and substituted amino lower alkylene oxy-lower alkyl halides. The lower alkyl halides include the 2 to 4 carbon atom halides, while the lower alkylene oxy-lower alkyl halides include those radicals having a total of 4 to 6 carbon atoms with the oxy substituted therebetween. The substituted amino compounds include the di-lower alkyl substituted amino reactant halides wherein the lower alkyl group contains from 1 to about 6 carbon atoms and together with the nitrogen atom, a five- or six-membered heterocyclic radical such as the pyrrolidino, morpholino, and piperidino radicals. The halides employed in the amino reactant halides include the bromides, chlorides, and iodides.

Preparation of the compounds of the present invention will be illustrated by the following examples. These examples are to be taken as illustrative only of the procedural methods and not by way of limitation. All parts are given by weight unless otherwise noted.

*Example I*

17 grams (0.1 mole) trans-decalin-9-carboxylic acid is dissolved in 120 milliliters of 2-propanol. 15 grams (0.112 mole) of β-diethylaminoethyl chloride are added to the solution which is heated and brought to reflux temperatures. After the mixture is refluxed for about ten hours, it is flash evaporated to dryness. The residue is diluted with 100 ml. distilled water, made slightly alkaline with caustic and extracted with petroleum ether. The ether extract is made acidic to Congo red with alcoholic hydrochloric acid. 9½ grams of crude product is recovered having a melting point of 165–169° C.

An 8 gram portion of the crude product is recrystallized using a mixture of 2-propanol and ethyl acetate, from which 5½ grams are recovered and determined to have a melting point of 169°–170° C. About 2 grams of a a second crop is recovered and determined to have a melting point of 169°–171° C. The product is analyzed to be β-diethylaminoethyl trans-decalin-9-carboxylate. The yield is about 30% of theoretical.

*Example II*

A mixture of 17 grams (0.1 mole) of cis-decalin-9-carboxylic acid, 3 grams (0.13 mole) of sodium dissolved in 125 ml. of 2-propanol is combined with 17 grams (0.13 mole) of β-diethylaminoethyl chloride hydrochloride dissolved in 95 ml. of 2-propanol. The mixture is heated at 75° C. in a closed glass container for about 36 hours. The solvent was removed under a water pump vacuum on the steam bath. The residue is made alkaline with a slight excess of 10% potassium hydroxide and the crude aminoester extracted with a 1:1 petroleum ether and diethyl ether mixture. A slight excess of alcoholic hydrochloric acid is added to the extract (acid to Congo red), and the crude hydrochloride salt of 2-diethylaminoethyl cis-decalin-9-carboxylate is recovered by filtration. The yield is about 28% of theoretical, and the crude product had a melting point above 125° C. with sintering.

Examples of additional compounds which may be prepared by the above procedure include 2-diethylaminopropyl trans-decalin-9-carboxylate,
3-dimethylaminopropyl cis-decalin-9-carboxylate,
2-(2-diethylaminoethoxy)-ethyl trans-decalin-9-carboxylate,
2-(1-pyrrolidyl)ethyl cis-decalin-9-carboxylate,
4-diethylaminobutyl trans-decalin-9-carboxylate,
2-di-(2-propyl)-ethyl trans-decalin-9-carboxylate,
3-morpholinylpropyl trans-decalin-9-carboxylate,
2-dibutylaminoethyl trans-decalin-9-carboxylate,
2-diethylaminoethyl trans-decalin-9-carboxylate methobromide,
2-diethylaminoethyl cis-decalin-9-carboxylate methobromide and the like.

For the preparation of quaternary ammonium compounds of basic esters according to the present invention, methyl bromide, methyl iodide, isobutyl bromide, and other lower alkyl chlorides, bromides, or iodides, dimethyl sulfate, diethyl sulfate, p-toluene sulfonic acid alkyl esters, benzyl halogenides, and the like may provide useful quaternizing agents.

The new substituted cis- and trans-decalin-9-carboxylates as herein prepared are excellent spasmolytic agents of surprisingly low toxicity, non-irritable to mucous membrane, and rapid onset of spasmolytic action after administration. These agents are useful in the treatment of the spastic colon and related functional gastro-intestinal disorders such as irritable colon, spastic constipation, mucous colitis, pyrospasms, biliary dyskinesia and the like. Although the dosage may be varied, the β-diethylaminoethyl trans-decalin-9-carboxylate, for instance, may be employed therapeutically in the form of ampoules containing 25 mg./cc.; in scored tablets containing 50 mg. per tablet; and in suppositories containing 50 mg. persuppository.

These new compounds as prepared herein may be dissolved in sterile distilled water or isotonic saline solution for administration by injection. The compounds may also be orally administered in the form of tablets, pills, dragees, or in solid and shaped form, or in powder form preferably enclosed in gelatin capsules. When administered orally in liquid form, the present compounds may be combined with carriers such as flavored syrups and the like.

When preparing tablets, pills, dragees and the like preparations, the commonly used diluting agents, binders and the like may be employed such as lactose, talcum, starch; and as binders, pectin, gelatin, gum arabic, methyl cellulose, yeast extract, agar tragacanth, and the like.

It is understood that the foregoing detailed description is given merely by way of illustration and that many variations may be made therein without departing from the spirit of this invention.

I claim:
1. A decalin compound of the formula:

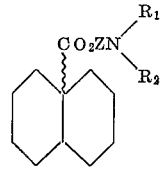

in which Z is a member of the group consisting of a lower alkyl having 1 to 6 carbon atoms, and together with the oxyalkylene having a total of 4 to 6 carbon atoms; and $R_1$ and $R_2$ are members of the group consisting of lower alkyl having 1 to 6 carbon atoms and together the nitro- nitrogen atom form pyrrolidino, morpholino or piperdino.

2. N-pyrrolidino lower alkyl-decalin-9-carboxylate.
3. N-piperidino lower alkyl-decalin-9-carboxylate.
4. N-pyrrolidino lower alkylene oxy-alkyl-decalin-9-carboxylate.
5. N-piperdino lower alkylene oxy-alkyl-decalin-9-carboxylate.
6. β-diethylaminoethyl-decalin-9-carboxylate.

References Cited by the Examiner

UNITED STATES PATENTS 2,673,853   3/1954   Rorig _____ 260—294.3

ALEX MAZEL, *Primary Examiner.*

JOSE TOVAR, *Assistant Examiner.*